United States Patent
Goslin et al.

(10) Patent No.: US 11,042,747 B2
(45) Date of Patent: Jun. 22, 2021

(54) MASKING METHOD FOR AUGMENTED REALITY EFFECTS

(71) Applicant: Disney Enterprises, Inc., Burbank, CA (US)

(72) Inventors: Michael P. Goslin, Sherman Oaks, CA (US); Elliott H. Baumbach, Porter Ranch, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 16/591,492

(22) Filed: Oct. 2, 2019

(65) Prior Publication Data

US 2021/0103730 A1 Apr. 8, 2021

(51) Int. Cl.
*G06K 9/00* (2006.01)
*G06F 3/01* (2006.01)
*G06F 3/03* (2006.01)

(52) U.S. Cl.
CPC ......... *G06K 9/00671* (2013.01); *G06F 3/012* (2013.01); *G06F 3/03* (2013.01)

(58) Field of Classification Search
CPC ........ G06K 9/00671; G06F 3/012; G06F 3/03
See application file for complete search history.

(56) References Cited

U.S. PATENT DOCUMENTS

| | | | |
|---|---|---|---|
| 2014/0028712 A1* | 1/2014 | Keating | G06T 7/246 345/633 |
| 2014/0028713 A1* | 1/2014 | Keating | G06F 3/0304 345/633 |
| 2015/0049012 A1* | 2/2015 | Liu | G06F 3/017 345/156 |

* cited by examiner

*Primary Examiner* — Sing-Wai Wu
(74) *Attorney, Agent, or Firm* — Patterson + Sheridan, LLP

(57) ABSTRACT

To provide masks for augmented reality (AR) effects in real-time, the embodiments described herein capture a plurality of images of an environment that includes one or more real-world objects after initiating an AR session with an AR device located in the environment. Upon detecting a trigger to generate an AR effect targeting a first real-world object of the one or more real-world objects, a first virtual representation of the first real-world object is generated, based on the plurality of images of the environment, and a second virtual representation of a second real-world object of the one or more real-world objects is generated based on the plurality of images of the environment, wherein the second real-world object is at least partially occluded by the first real-world object.

18 Claims, 7 Drawing Sheets

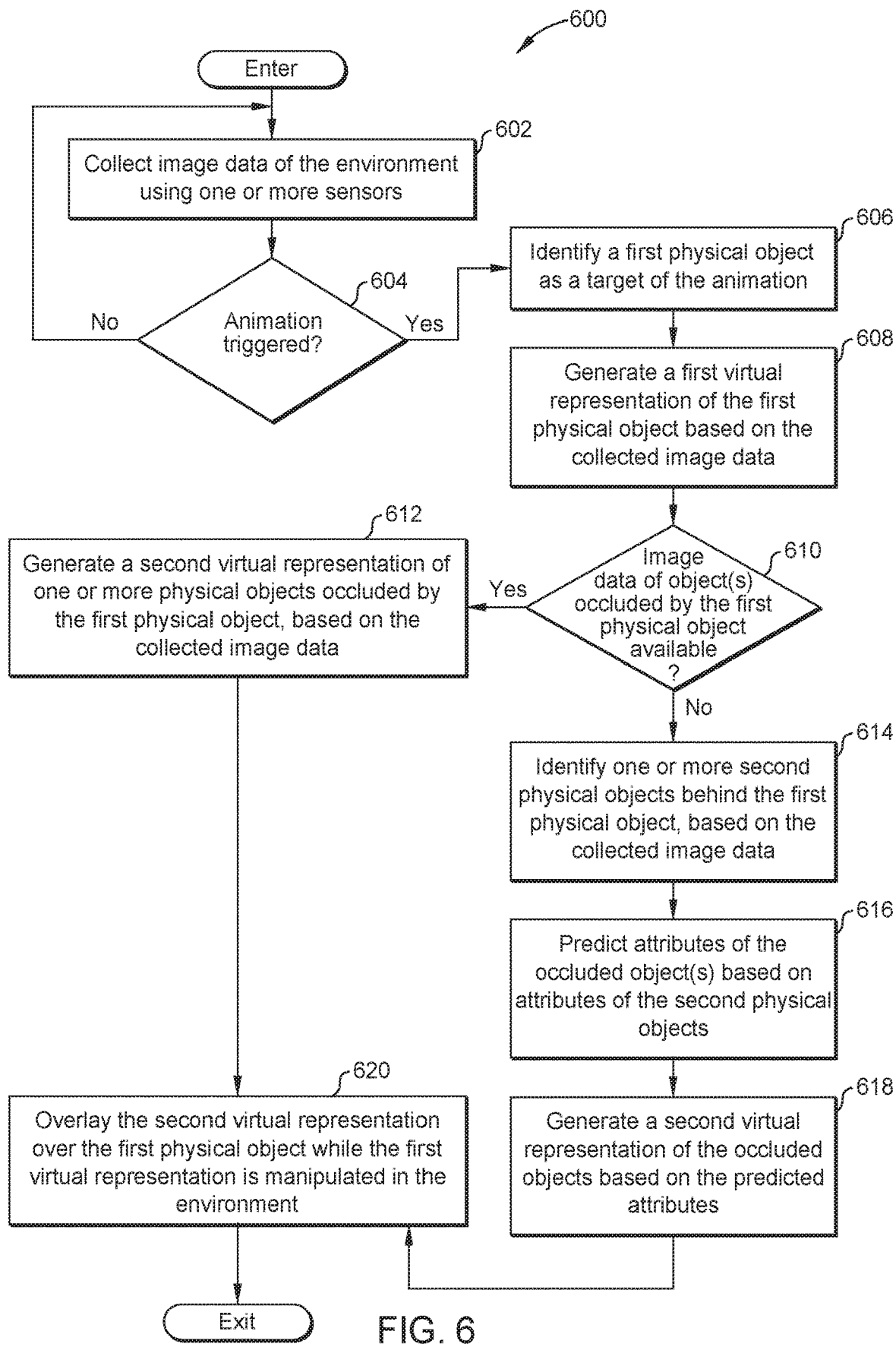

MASKING METHOD FOR AUGMENTED REALITY EFFECTS

BACKGROUND

Augmented Reality (AR) uses a video device and a display device to display a series of images of the environment to a user, wherein the images have various virtual objects inserted into appropriate places in the environment. For example, a video device may identify a real-world object of a table, so that a virtual object of a flower vase may be displayed on the display device as appearing on the table. In another example, a video device may identify a real-world object of a trashcan and overlay an image of a monster, so that a user of the display device is provided an amusing scene of a creature devouring rubbish when the mundane scene of a person placing rubbish into a proper receptacle is played out. AR can be used for navigational purposes, for games, construction/architectural projects, for educational purposes, and the like.

An AR system may use an integrated video and display device (or separate video devices and display devices) that output the perspective of the video device. The AR system can use the knowledge and perspective of the video device to inform the output of the display device. For example, a headset display may include an outwardly mounted camera as a video device that provides a video feed to one or more display devices positioned in front of a wearer's eyes.

SUMMARY

In one embodiment, a computer-implemented method includes initiating an augmented reality (AR) session within an environment comprising one or more real-world objects, where an environmental map of the environment is unavailable for generating AR effects for the AR session at a time of the initiation of the AR session. The method also includes, after initiating the AR session, detecting at least a first trigger in the environment for capturing a plurality of images of the environment, and capturing the plurality of images of the environment in response to detecting at least the first trigger. The method further includes, upon detecting a second trigger to generate an AR effect targeting a first real-world object of the one or more real-world objects: (i) generating a first virtual representation of the first real-world object, based on the plurality of images of the environment; and (ii) generating a second virtual representation of a second real-world object of the one or more real-world objects, based on the plurality of images of the environment, wherein the second real-world object is at least partially occluded by the first real-world object.

Another embodiment described herein is a computer-readable medium containing computer program code that, when executed by operation of one or more computer processors, performs an operation that includes initiating an augmented reality (AR) session within an environment comprising one or more real-world objects, where an environmental map of the environment is unavailable for generating AR effects for the AR session at a time of the initiation of the AR session. The operation also includes, after initiating the AR session, detecting at least a first trigger in the environment for capturing a plurality of images of the environment, and capturing the plurality of images of the environment in response to detecting at least the first trigger. The operation further includes, upon detecting a second trigger to generate an AR effect targeting a first real-world object of the one or more real-world objects: (i) generating a first virtual representation of the first real-world object, based on the plurality of images of the environment; and (ii) generating a second virtual representation of a second real-world object of the one or more real-world objects, based on the plurality of images of the environment, wherein the second real-world object is at least partially occluded by the first real-world object.

Another embodiment described herein is a system comprising a processor and a memory comprising instructions, which, when executed on the processor, performs an operation that includes initiating an augmented reality (AR) session within an environment comprising one or more real-world objects, where an environmental map of the environment is unavailable for generating AR effects for the AR session at a time of the initiation of the AR session. The operation also includes, after initiating the AR session, detecting at least a first trigger in the environment for capturing a plurality of images of the environment, and capturing the plurality of images of the environment in response to detecting at least the first trigger. The operation further includes, upon detecting a second trigger to generate an AR effect targeting a first real-world object of the one or more real-world objects: (i) generating a first virtual representation of the first real-world object, based on the plurality of images of the environment; and (ii) generating a second virtual representation of a second real-world object of the one or more real-world objects, based on the plurality of images of the environment, wherein the second real-world object is at least partially occluded by the first real-world object.

BRIEF DESCRIPTION OF THE DRAWINGS

So that the manner in which the above recited aspects are attained and can be understood in detail, a more particular description of embodiments described herein, briefly summarized above, may be had by reference to the appended drawings.

It is to be noted, however, that the appended drawings illustrate typical embodiments and are therefore not to be considered limiting; other equally effective embodiments are contemplated.

FIG. 6 is another flowchart for generating a mask for an AR effect, according to one or more embodiments.

Figure 1:
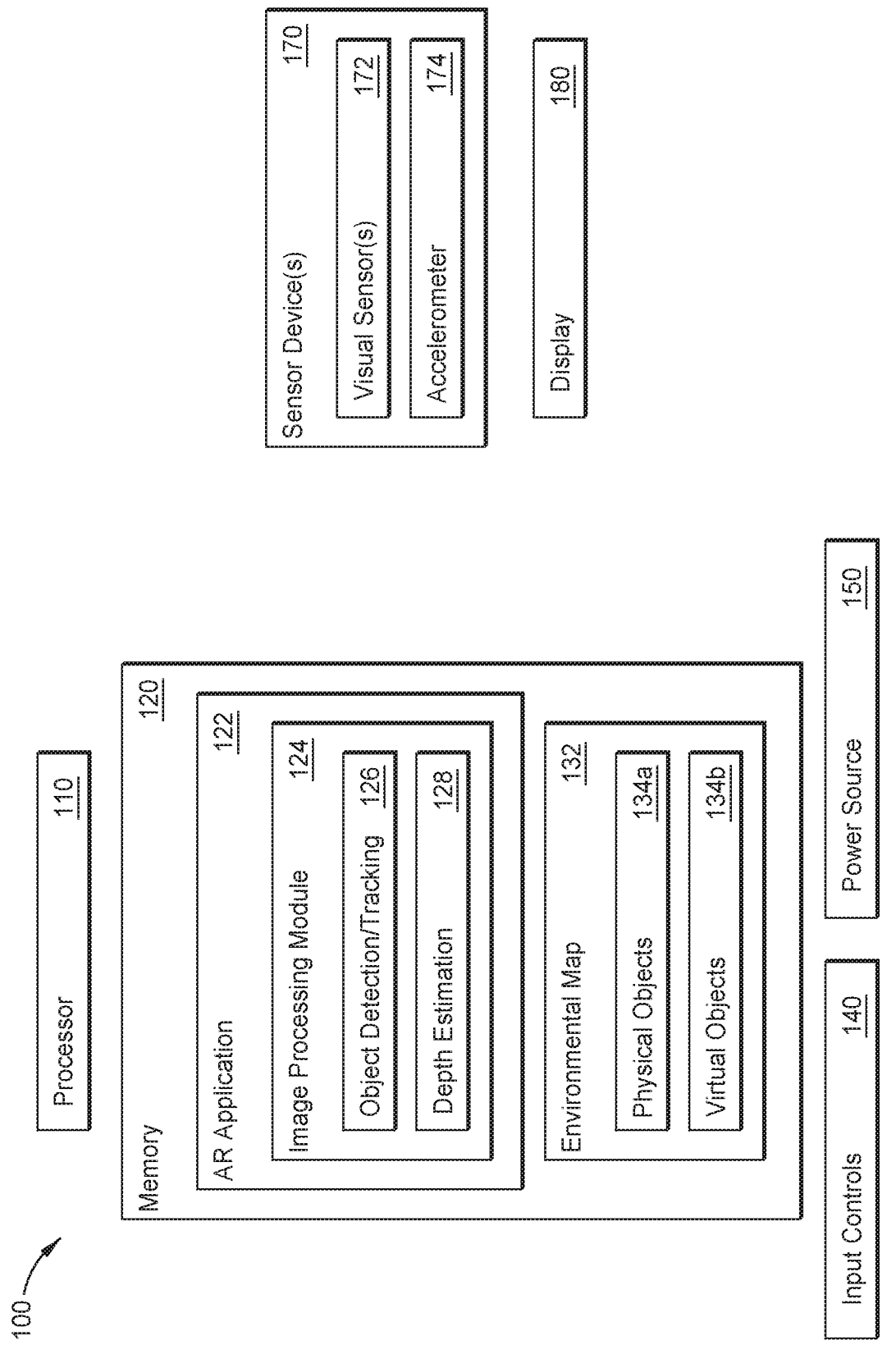
FIG. 1 is a schematic representation of an AR system, according to one or more embodiments.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The

DETAILED DESCRIPTION

AR systems generally seek to provide AR effects where virtual representations of physical (or real-world) objects are manipulated in the environment. For example, an AR system may provide an interactive environment in which the user is able to pick up a virtual representation of a real-world object of a table in the environment. In another example, an AR system may provide an interactive environment in which the user is able to battle (or interact with) a virtual representation of a person (or another user) in the environment. To improve the immersive nature of an interactive environment, AR systems can improve the appearance of an AR effect by occluding a portion of the real-world object that is the target of the AR effect. For example, the AR system can replace (or mask) the real-world object with an image of what the real-world object occludes.

The techniques that are used by conventional AR systems to obtain image data of what is occluded by real-world objects in an environment are generally inefficient and time-consuming. One conventional technique, for example, involves pre-modeling or scanning the entire environment prior to starting an AR session, and generating an environmental map (e.g., a mesh) of the entire environment. In this technique, the AR system can obtain image data of what is occluded by the real-world objects from a given perspective of the AR system based on the environmental map. Another conventional technique involves creating a custom AR environment for the AR session, such that the AR system has a priori knowledge of all the virtual and real-world objects in the environment. Yet another conventional technique involves using a pre-configured virtual image (e.g., a shadow) to mask the real-world object. In this technique, for example, the AR system may have information about the colors or lighting used in a particular room, and can use the information to generate an image that averages all the colors used in the room. The AR system can use the generated image as a shadow over the real-world object in the environment. Using shadow images as masks, however, are generally not desirable, since they can distract from the user's interactive experience.

Embodiments herein describe an AR system which captures in real-time (e.g., during an interactive AR session) image data of objects that are occluded by other objects in an environment. For example, after the AR system is powered on (or an AR session is initiated), the AR system can identify the environment in which it is located (e.g., using a position sensor) and determine whether an environmental map is available for the environmental. Upon determining that the environmental map is unavailable (e.g., the environment may not have been pre-scanned prior to powering on the AR system), the AR system can start collecting image data of the environment (e.g., a room that includes one or more physical (or real-world) objects). The image data can be collected at specific points in time, such as prior to triggering a particular animation, so that a mesh of entire environment is not required. For example, assume that a user is participating in an interactive throwing game in the room and is attempting to pick up and throw an object during the interactive throwing game. Prior to picking up and throwing the object, the user may make motions (e.g., moving toward the object, attempting to grab the object) that result in different viewpoints of the room from the perspective of the AR system. For example, if the user is wearing a head mounted AR system (also referred to herein as an AR headset), the user may make head movements (e.g., moving the head up, down, left, right, etc.) and/or body movements (e.g., walking toward the object) prior to picking up and throwing the object that change the perspective of the AR system within the environment. In this case, the AR system can be configured to capture images (and other sensor data) of the room each time the AR system detects a change in the user's movement. The AR system can then use the images captured in real-time (from the various viewpoints) to generate an AR effect of the object being picked up and thrown.

In one embodiment, for example, the AR system can use the image data collected in real-time to generate two virtual objects: (1) a virtual object that is representative of the real-world object that is the target of the AR effect and (2) a virtual object that is representative of one or more real-world objects occluded by the real-world object that is the target. Continuing with the reference example of the throwing game, the target of the AR effect (also referred to herein simply as "target") is the object being thrown. The AR system can generate a virtual object of the target that can be manipulated (e.g., thrown) in the room and generate another virtual object of what is occluded by the target. The AR system can use the virtual object of what is occluded by the target as a mask (or overlay) for the real-world object that is the target, while the user manipulates the virtual object of the target. In this manner, embodiments allow for AR systems to be used in a wide range of environments, reducing the need for scanning and generating predefined environmental maps of an environment prior to initiating an AR session.

FIG. 1 illustrates an AR system 100. The AR system 100 includes a processor 110, a memory 120, and various hardware elements to provide a user with an AR experience. In this particular embodiment, the hardware elements include input control(s) 140, a power source 150, a radio 160, sensor devices 170, and a display 180. In various embodiments, the AR system 100 may be an AR headset or a general computing device (e.g., a smart phone, a tablet computer, a laptop computer) that provides an AR experience.

The processor 110 and the memory 120 provide computing functionality to the AR system 100. The memory 120 may be one or more memory devices, such as, for example, Random Access Memory (RAM), Read Only Memory (ROM), flash memory, or any other type of volatile or non-volatile storage medium that includes instructions that the processor 110 may execute. The processor 110 may process data received from one or more elements of the AR system 100. For example, the processor 110 may execute commands based on inputs received from the input controls 140. Further, the processor 110 may instruct the display 180 to display one or more AR effects based on sensor data received by the radio 160. In various embodiments, the processor 110 may be processor capable of performing the functions described herein. In one embodiment, the processor 110 is a general processing computer, such as a central processing unit (CPU) of the AR system 100. Further, the processor may be an application specific integrated controller (ASIC).

The memory 120 generally includes program code for performing various functions related to providing an AR experience (including one or more AR effects) to a user. The program code is generally described as various functional "applications" or "modules" within the memory 120, although alternate implementations may have different functions or combinations of functions. The memory 120 also generally includes data structures that may store information for use by the various program code modules also stored thereon. For example, the memory 120 includes program code for an AR application 122 and data structures for environmental maps 132. Further, other applications and data structures may also be included within the memory 120.

The AR system 100 includes one or more input controls 140 to receive input from a user to control the AR experience. The input controls 140 may include physical joysticks, physical steering wheels/yokes, physical buttons, physical switches, microphones, and a touch interface that designates various regions for use as virtual joysticks, buttons, switches, etc. A user may manipulate the various input controls 140 to signal the AR application 122 to alter the AR experience, shut down the AR system 100, switch to a different application, change system settings (e.g., volume, brightness), etc. In one embodiment, the input controls 140 may be separate from one or more other elements of the AR system 100. For example, the input controls 140 may be separate from the display 180 and/or the sensor devices 170.

The power source 150 provides electric power to the various components of the AR system 100. Various examples of power sources 150 include batteries (rechargeable and non-rechargeable), Alternating Current to Direct Current (AC/DC) converters, Direct Current to Alternating Current (DC/AC) converters, transformers, capacitors, inductors, and wiring to connect to an external power source.

The radio 160 provides wireless communications for the AR system 100. In various embodiments, the radio 160 is a transmitter and/or receiver, which receives signals from external sources and transmits signals to external devices. The radio 160 may be in communication with various antennas and transmit and receive messages according to various standards, such as, Bluetooth, Bluetooth Low Energy, Wi-Fi, or a proprietary standard, among others. The radio 160 may include receiver circuitry that is configured to receive signals from the one or more remote devices. The receiver circuitry may be wireless receiver circuitry.

The sensor devices 170 may be of any suitably type(s) and configured to sense information from the environment. Some non-limiting examples sensor devices 170 include visual sensors 172, audio sensors (e.g., microphone), pressure sensors, acceleration sensors, gyroscope, and temperature sensors. The visual sensors 172 generally include camera(s) configured to sense visible light and/or infrared light. In one embodiment, the AR system 100 may be equipped with a single camera as a visual sensor 172. In another embodiment, the AR system 100 may be equipped with multiple cameras as visual sensors 172. In some embodiments, a camera may be optionally included or activated in the AR system 100 to provide a video feed over which AR objects may be overlaid or into which AR objects may be programmatically inserted. The camera may be omitted or deactivated in embodiments that use an external device to provide a video feed or a transparent surface that a user may view the environment through.

In one embodiment, the sensor devices 170 may include an accelerometer 174, which measures acceleration forces acting on the AR system 100, and may provide the AR system 100 with information of whether the AR system 100 (or a portion thereof) is moving, and in which direction(s). In some embodiments, the sensor devices 170 may provide absolute positioning information (e.g., via a Global Positioning System (GPS) receiver) and relative positioning information (e.g., via a range finder, a camera sensor including image recognition software to identify objects and distances thereto based on known sizes).

In some embodiments, the sensor devices 170 may be included with (or within) the AR system 100. For example, if the AR system 100 is a smartphone or tablet device, the sensor devices 170 may include camera(s), inertial motion units (IMUs), etc., that are included within the smartphone/tablet device. In some embodiments, the sensor devices 170 may include sensors that are external to the AR system 100, e.g., a visual sensor 172 included with a head-worn device.

The display 180 includes one or more devices used to output AR objects or a video feed to a user. In one example, the display 180 includes a projector and a transparent/translucent surface onto which AR images are projected by the projector and through with a user may view the environment into which the AR objects are inserted. In another example, a Liquid Crystal Display (LCD), Light Emitting Diode (LED), or other display technology is used to present a video feed into which AR objects have been programmatically inserted or overlaid for output to the user. In one or more embodiments, two displays 180 are provided, one for each eye of a user, such that the user is provided three-dimensional AR objects in the field of view. In one or more embodiments, the display 180 is transparent such that physical objects 134a (or real-world objects) are visible through the display 180. In such an embodiment, one or more virtual objects 134b may be overlaid with the physical objects 134a and displayed on the display 180.

Additional Input/Output (I/O) devices (not shown) may be included in various embodiments of an AR system 100. The additional I/O devices may include various lights, displays, and speakers (e.g. LEDs, IR transmitter/receivers, speaker, buttons, microphones, light sensors, etc.) for providing output from the AR system 100 in addition to that provided by the display 180 or radio 160. For example, a speaker is an I/O device that provides audio output (e.g., of an audio component of a video feed or an AR sound effect). Further, the additional I/O devices may include a transmitter or a transceiver for communicating with other devices.

The AR application 122 is generally configured to provide functionality to overlay AR objects (also referred to herein as virtual objects) onto a video feed of the environment. In some embodiments, the code for the AR application 122 is provided to manage commands sent to and data feeds received from one or more remote devices (e.g., one or more remote camera devices) as well as various sensors of the AR system 100.

The AR application 122 includes an image processing module 124, which is generally configured to perform processing of image information captured by visual sensors 172 (e.g., one or more cameras) and display images. In some examples, the image processing module 124 can identify (e.g., via one or more visual sensors 172) various real-world objects in the field of view (e.g., of the visual sensors 172), which can be used by the AR application 122 as an anchor point for an AR object output to the user on a display (e.g., display 180).

The image processing module 124 may include any number of image processing functions, such as an object detection and tracking component 126 and a depth estimation component 128. The object detection/tracking component 126 can detect physical (or real-world) objects within an environment and/or track the relative location of detected objects over time (e.g., as a user and/or the objects move throughout the interactive environment). The depth estimation component 128 can dynamically estimate a distance of the detected objects from the user. The AR system 100 can use the depth information in order to provide AR effects at a correct depth (e.g., relative to other physical objects detected in the environment).

The AR application 122 may start generating an environmental map 132 of an environment in which the AR system 100 is located at a startup of the AR system 100 or at the initiation of an AR session. In one embodiment, generating an environmental map 132 of a given environment may include identifying a positon of one or more physical (or real-world) objects 134a and/or virtual objects 134b in the environment. The positional data may be indicated via relative coordinates (e.g., X meters from another object, X meters from the AR system 100) or by absolute coordinates (e.g., at latitude X and longitude Y), include positions of various components of the object (e.g., facial expressions, poses/limb positions, open/closed statuses), and include orientations of the object in the environment (e.g., facing X direction). Various real-world objects (e.g., physical objects 134a) may be classified and identified in the environmental map 132 (e.g., a tree, a road, a wall, a door, a person, etc.) via image recognition or signals transmitted (e.g., via sensor devices 170) and depicted as virtual objects 134b.

Figure 2:
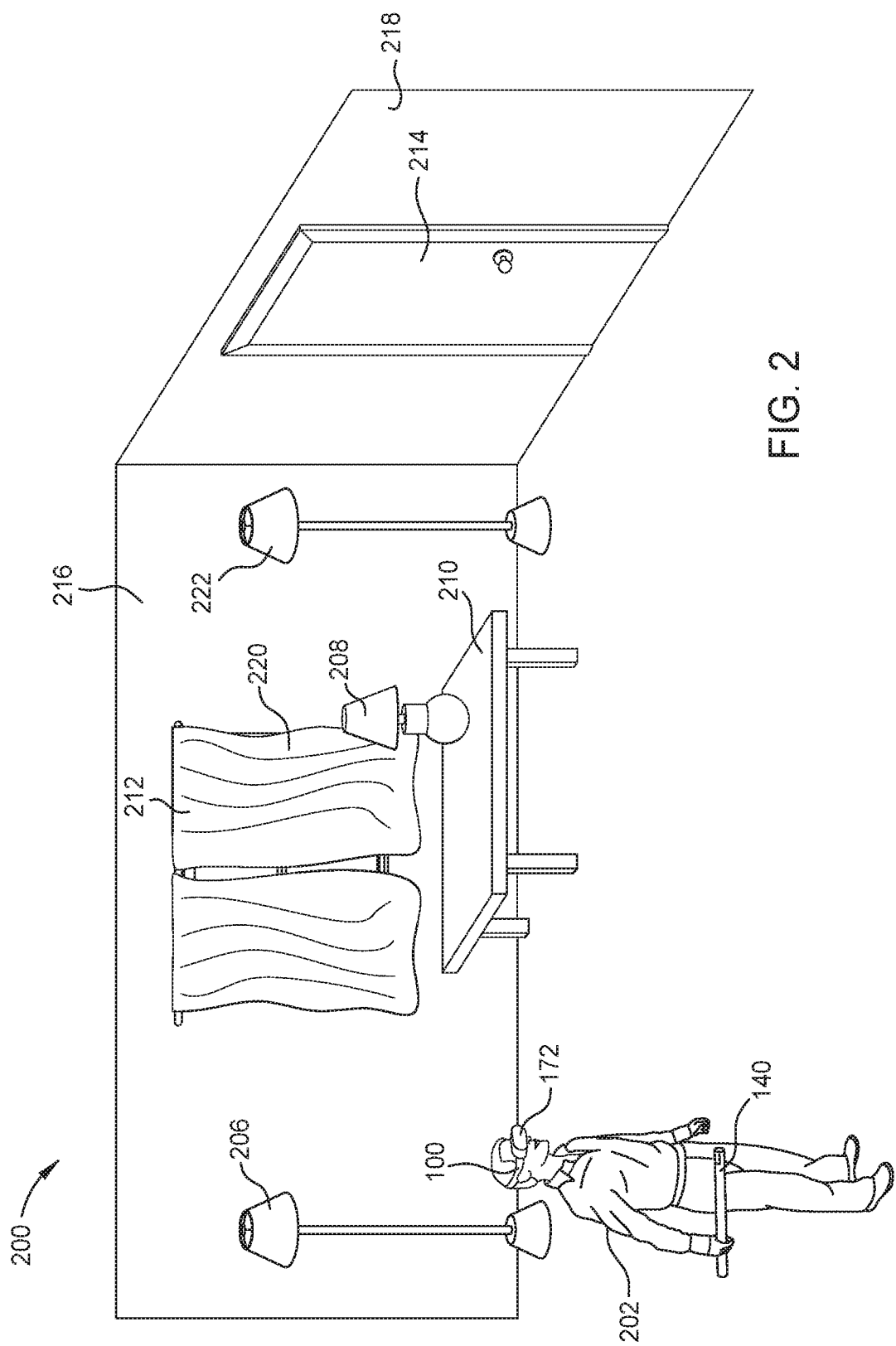
FIG. 2 is an example of a real-world environment, according to one or more embodiments.

FIG. 2 illustrates a real-world environment 200, according to one or more embodiments. The real-world environment 300 includes multiple physical (or real-world) objects (representing the physical objects 134a of FIG. 1), including for example, floor lamp 206, floor lamp 222, table lamp, 208, table 210, window 212, door 214, wall 216, wall 218, curtains 220, user (or person) 202, and user 204. In one or more embodiments, the user 202 may use AR system 100 to participate in an AR session within the real-world environment 200. For example, in some cases, one or more of the physical objects depicted in FIG. 2 (representing the physical objects 134a of FIG. 1) may be viewable through the display 180 of the AR system 100 and virtual objects may be overlaid onto the display 180.

In some cases, the AR system 100 may generate an AR effect by masking a physical object in the environment with a virtual image of what the physical object occludes. In conventional AR systems, the image data associated with the occluded object(s) is typically obtained based on a scan of the environment completed prior to the AR session. For example, in conventional AR systems, before the user 202 could participate in an AR session in the environment 200, a scan of the entire environment 200 would be performed and an environmental map (e.g., three-dimensional (3D) mesh) would be generated based on the scan. However, performing masking for AR effects in this manner can affect the overall flexibility and usefulness of AR systems.

Rather than perform masking for AR effects in an environment based on prior generated scans of the environment, embodiments described herein can perform masking for AR effects based on image data of objects in the environment captured in real-time, e.g., while the user 202 is engaged in an interactive AR session. In FIG. 2, for example, the user 202 may have entered into the environment 200 for the first time and may not have performed a scan of the environment 200. In this case, upon starting (e.g., powering on) the AR system 100 and/or initializing an interactive AR session with the AR system 100, the AR system 100 may begin capturing image data of objects in the environment 200 using visual sensor 172 (e.g., a camera). In one embodiment, the AR system 100 may capture image data every time the AR system 100 detects (e.g., via an accelerometer) movement of the user 202 within the environment. For example, after starting the AR system 100, the user 202 may make head motions (e.g., look left, look right, look up, look down, etc.), change viewpoints (e.g., by turning), walk to different areas, etc. As the user 202 moves, the perspective of the AR system 100 in the environment 200 can change, allowing the AR system 100 to capture multiple images of the environment 200 from various different viewpoints.

The AR system 100 may use the captured images to identify the positions of physical objects in the environment, and create virtual objects to mask one or more physical objects during an AR effect. For example, assume the user 202 is attempting to pick up the lamp 208 in the environment 200 as part of an AR session. In this example, the AR system 100 can generate a virtual representation of the lamp 208 for the user to pick up and manipulate, and generate another virtual representation of what is occluded by the lamp 208 to use as a mask (or overlay) for the lamp 208. The AR system 100 can generate both virtual representations using the images collected in real-time by the visual sensors 172, as opposed to relying solely on an environmental map generated prior to the AR session.

Figure 3A:
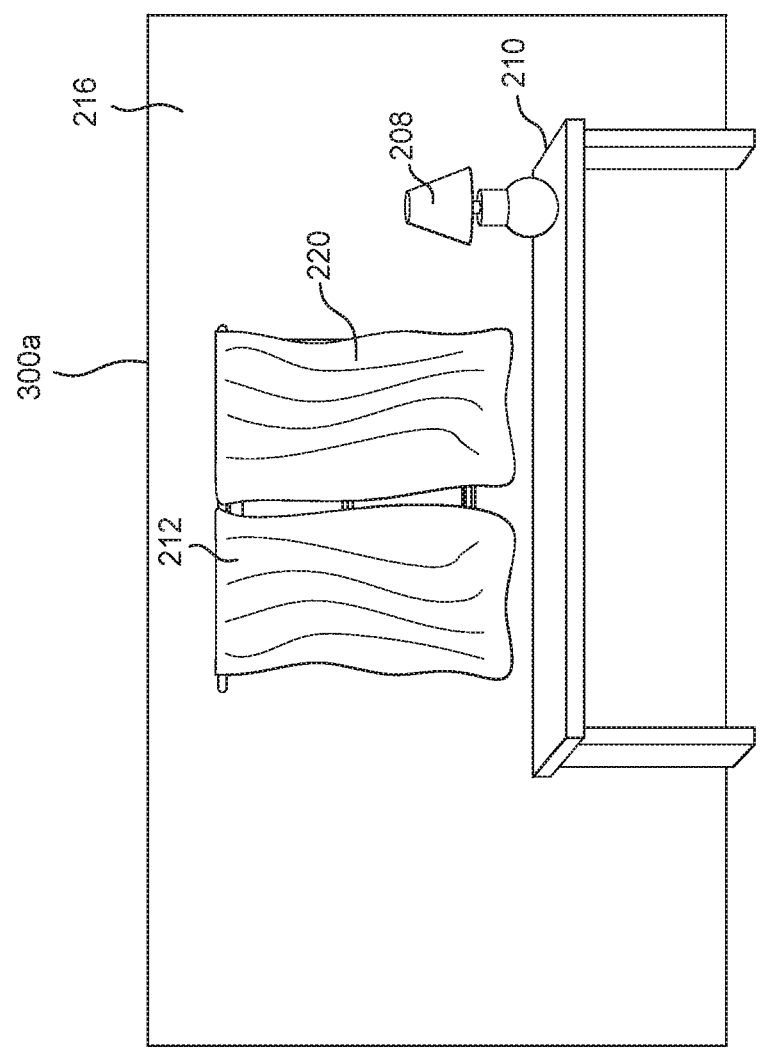
FIGS. 3A-3B illustrate a field of view of an AR system during an AR session, according to one or more embodiments.
Figure 3B:
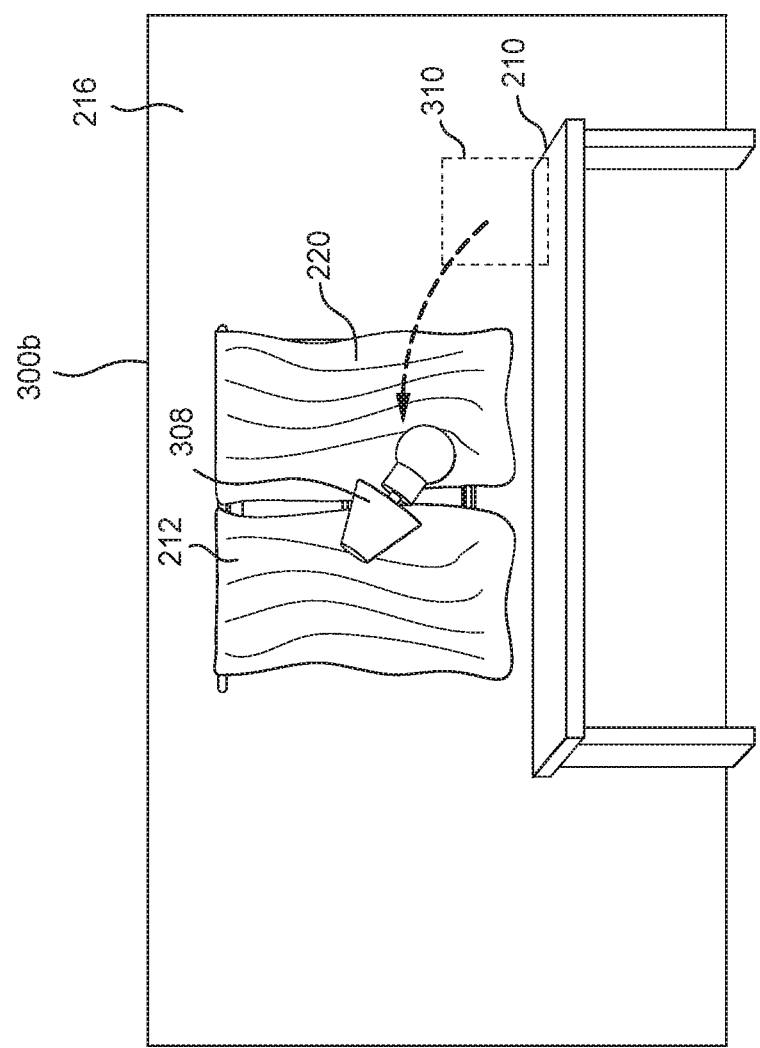

FIGS. 3A-3B depict an example AR session, based on images captured in real-time by an AR system, according to one or more embodiments. In particular, FIG. 3A depicts an AR scene 300a from the point of view of a user (e.g., user 202) via a display (e.g., display 180) of an AR system (e.g., AR system 100). Initially, in AR scene 300a, one or more physical objects 134a (or at least a portion of the physical objects 134a) are in view of the user. Here, the user may be participating in an AR session and may attempt to interact with one of the physical objects 134a (e.g., lamp 208), via the AR system 100.

In one embodiment, the AR system 100 may detect the user's attempt to interact with the lamp 208 and trigger an animation targeting lamp 208. For example, the animation may involve generating a first virtual representation of the real-world object and a second virtual representation of what is occluded by the real-world object. As shown in AR scene 300b of FIG. 3B, for example, the AR system 100 may generate a virtual representation 308 of the lamp 208. The user may interact with (e.g., manipulate) the virtual representation 308 (i.e., the virtual lamp 308) using the AR system 100. In the particular example shown in FIG. 3B, the user may throw (e.g., in the direction of dotted arrow) the virtual lamp 308 across the table 210. At the same time, the AR system 100 may generate a virtual representation 310 of what was occluded by the physical lamp 208. Here, the virtual representation 310 is an image of a portion of the wall 216 and a portion of the table 210. The AR system 100 may display the virtual representation 310 while the user interacts with the virtual lamp 308. In this way, the virtual representation 310 obscures the physical lamp 208 while the virtual lamp 308 replaces the physical lamp in the user's AR experience, thus producing the visual appearance of the lamp 208 being thrown.

Figure 4:
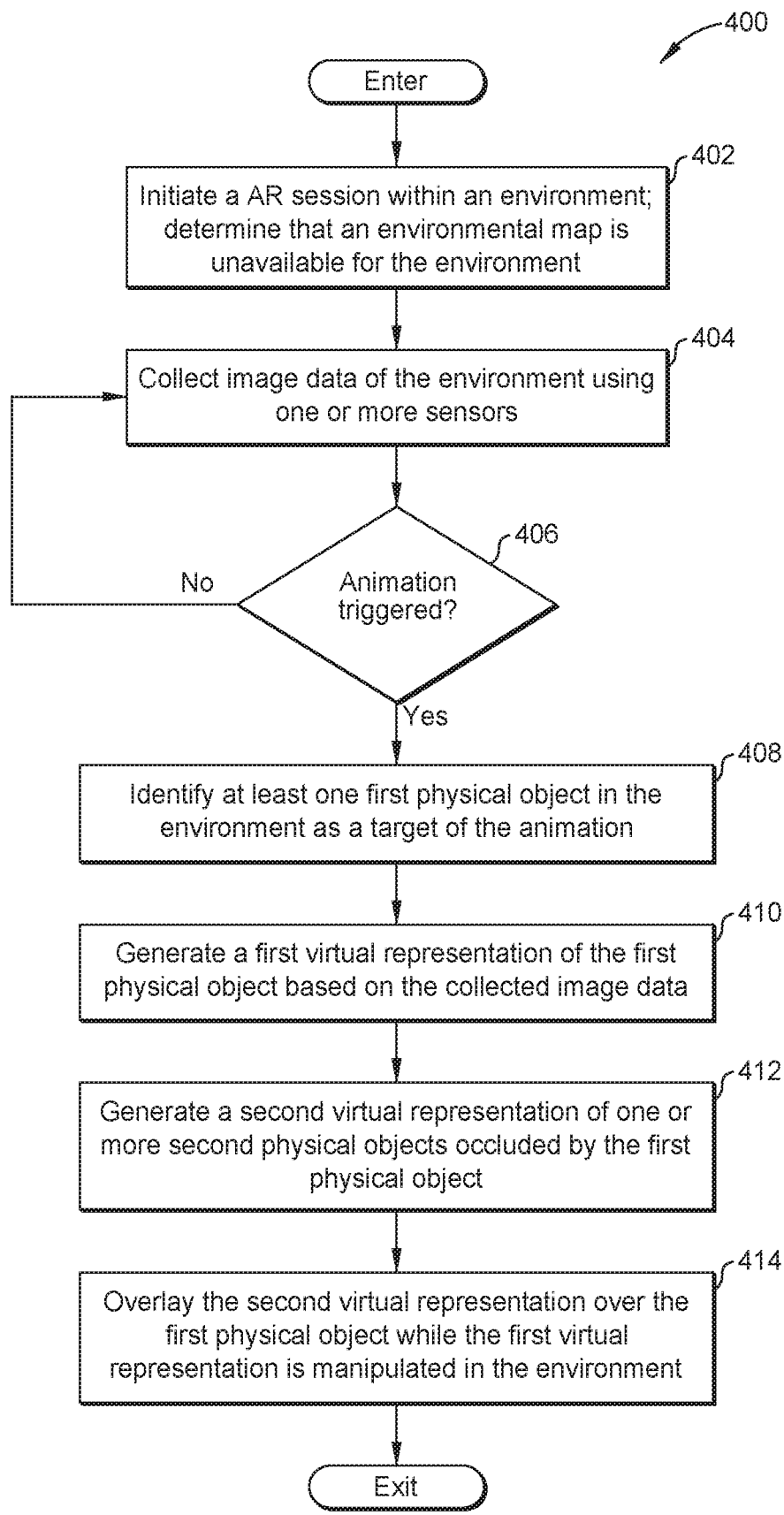
FIG. 4 is a flowchart for generating a mask for an AR effect, according to one or more embodiments.

FIG. 4 is a flow chart of a method 400 for generating a mask for an AR effect, according to one or more embodiments. The method 400 may be performed by an AR system (e.g., AR system 100).

The method 400 may enter at block 402, where an AR session is initiated within a real-world environment (e.g., environment 200). The AR session may be initiated by a user, via the AR system 100. In some cases, at block 402, the AR session may be initiated upon powering on (or activating) the AR system. At block 402, the AR system determines that an environmental map is unavailable for the environment. For example, the AR system may have been activated and/or the AR session may have been initiated in the environment for the first time. At block 404, the AR system collects image data of the environment using one or more sensors (e.g., sensor devices 170).

At block 406, the AR system determines whether an animation has been triggered. In one embodiment, the AR system may determine an animation is triggered based on user movement. For example, the AR system may detect that the user is attempting to interact with a particular physical object (e.g., physical object 134*a*) in the environment. If the AR system determines that an animation has not been triggered, the AR system continues to collect image data of the environment (block 404). For example, the AR system may continue to collect image data of the environment from various different viewpoints.

On the other hand, if the AR system determines that an animation has been triggered, the AR system identifies at least one first physical object (e.g., lamp 208) in the environment as a target of the animation (block 408). At block 410, the AR system generates a first virtual representation (e.g., virtual lamp 308) of the first physical object based on the collected image data. At block 412, the AR system generates a second virtual representation (e.g., virtual representation 310) of one or more second physical objects (e.g., table 210, wall 216) occluded by the first physical object. At block 414, the AR system overlays the second virtual representation over the first physical object while the first virtual representation is manipulated in the environment (e.g., as part of the animation).

Figure 5:
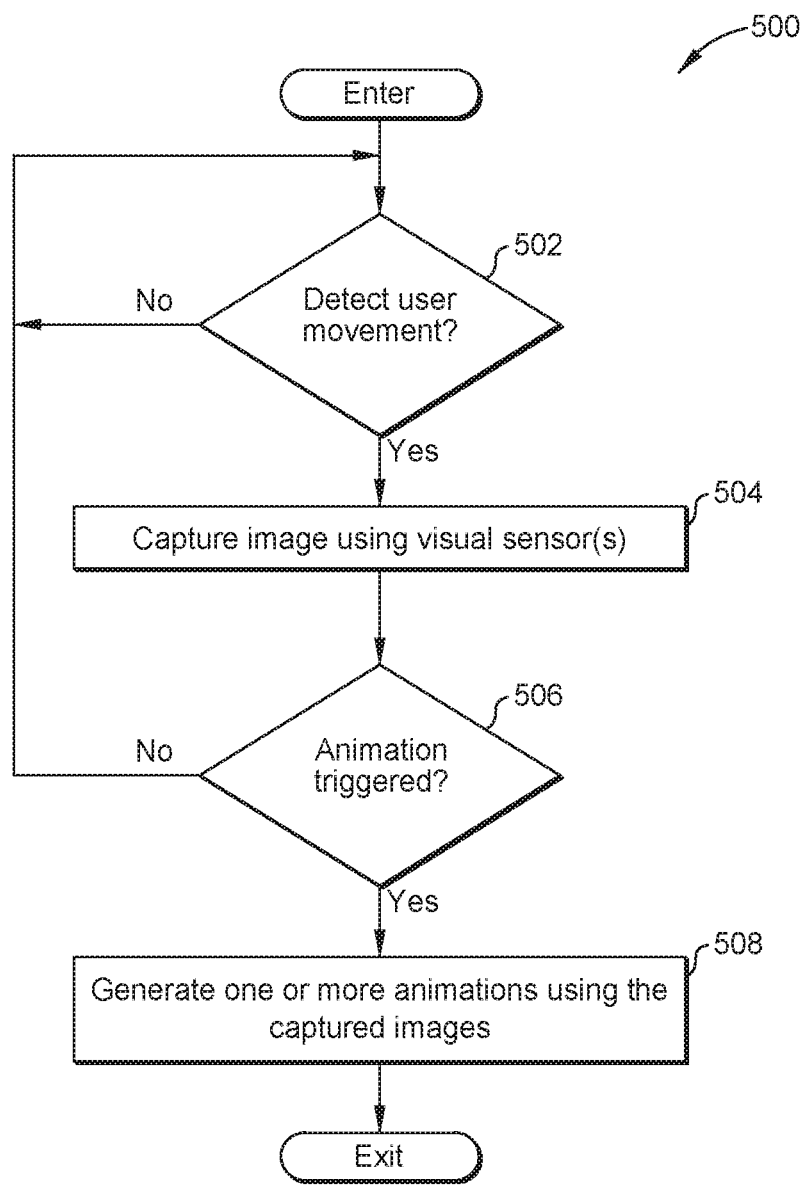
FIG. 5 is a flowchart for capturing images to be used for an AR effect, according to one or more embodiments.

FIG. 5 is a flow chart of a method 500 for capturing images to be used for an AR effect in an environment, according to one or more embodiments. The method 500 may be performed by an AR system (e.g., AR system 100).

The method 500 may enter at block 502, where the AR system determines whether user movement has been detected. In one embodiment, the AR system may detect user movement based on a sensor device (e.g., accelerometer 174) within the AR system. For example, the AR system may be a head mounted AR device worn by the user. In this example, the AR system may be able to detect, using the sensor device, head movements, body movements, etc. of the user within the environment.

If the AR system does not detect user movement, the AR system may refrain from capturing an image. On the other hand, if the AR system does detect user movement, the AR system captures an image of the environment using visual sensor(s) (e.g., visual sensor 172) of the environment. At block 506, the AR system determines whether an animation has been triggered (e.g., by the user of the AR system). If not, the AR system returns to block 502. If, on the other hand, the AR system determines an animation has been triggered, the AR system generates one or more animations using the captured images (block 508).

As part of blocks 502, 504, and 506, the AR system may continually capture images of the environment each time it detects user movement. Each captured image of the environment may be from a different viewpoint of the AR system, such that the AR system gathers information about the physical objects in the environment from various different viewpoints. By capturing images in this manner, the AR system can build a point cloud of the environment in real-time. In one embodiment, the AR system may build a point cloud of the environment using a single visual sensor (e.g., single camera) and a depth sensor. For each image of one or more physical objects in the environment, the AR system may determine the depth (relative to the AR system) of the one or more physical objects in the image using the depth sensor. In another embodiment, the AR system may build a point cloud of the environment using multiple visual sensors (e.g., multiple cameras), where at least one of the multiple visual sensors is used to infer depth of the one or more physical objects (relative to the AR system).

FIG. 6 is a flow chart of another method 600 for generating a mask for an AR effect, according to one or more embodiments. The method 600 may be performed by an AR system (e.g., AR system 100).

The method 600 may enter at block 602, where the AR system collects image data of an environment (e.g., environment 200) using one or more sensors (e.g., sensor devices 170). In one embodiment, the AR system may begin collecting the image data after being powered on for the first time in the environment. In one embodiment, the AR system may perform block 602 using the method 500 depicted in FIG. 5.

At block 604, the AR system determines whether an animation associated with one of the physical objects has been triggered. If not, the AR system continues to collect image data (block 602). On the other hand, if the AR system determines that an animation has been triggered, the AR system identifies a first physical object (e.g., lamp 208) as a target of the animation (block 606). At block 608, the AR system generates a first virtual representation (e.g., virtual lamp 308) of the first physical object based on the collected image data.

At block 610, the AR system determines whether image data of one or more objects occluded by the first physical object is available. In some cases, the AR system may not have captured images of the occluded objects because the viewpoints of the occluded objects may have been unavailable to the AR system (e.g., the user may not have been in the particular positions within the environment where the occluded objects were visible). In some cases, the AR system may not have had enough time to capture images of the occluded objects (e.g., the user may have triggered an animation before the AR system could capture images of the occluded objects). In some cases, the AR system may have partial images of the occluded objects.

If, at block 610, the AR system determines that image data of the occluded object(s) is available, then AR system generates a second virtual representation of one or more physical objects occluded by the first physical object, based on the collected image data (block 612). At block 620, the AR system overlays the second virtual representation over the first physical object while the first virtual representation is manipulated in the environment.

On the other hand, if at block 610, the AR system determines that image data of the occluded object(s) is not available, the AR system identifies one or more second physical objects behind the first physical object, based on the collected image data (block 614). For example, the second physical object(s) may be a physical object(s) (or at least a portion(s) of a physical object(s)) that is behind the first physical object, but not necessarily occluded by the first physical object. Using FIG. 3A as a reference example, assuming lamp 208 is the first physical object, the AR system may identify wall 216 as a physical object that is behind (e.g., in the foreground) of lamp 208.

At block 616, the AR system predicts attributes of the occluded object(s), based on attributes of the second physical object(s). For example, the attributes may include, but are not limited to, color, lighting, shading, etc. At block 618, the AR system generates a second virtual representation of the occluded objects based on the predicted attributes. In one reference example, assume that the AR system determines that an amount of images (e.g., above a predefined threshold) indicate that the color (e.g., attribute) of the wall 216

(e.g., second physical object) behind the lamp 208 (e.g., first physical object) is red. In this case, the AR system can predict that the occluded portions include a wall that is also red, and generate a virtual representation of the wall 216 with red pixels. The AR system can then use the virtual representation of the wall 216 with red pixels to mask the lamp 208, while the virtual lamp 308 is manipulated as part of the AR effect (block 620). For example, the AR system can apply a gradient to blend in the virtual representation of the wall 216 with red pixels over the lamp 208, as the mask.

In the current disclosure, reference is made to various embodiments. However, it should be understood that the present disclosure is not limited to specific described embodiments. Instead, any combination of the following features and elements, whether related to different embodiments or not, is contemplated to implement and practice the teachings provided herein. Additionally, when elements of the embodiments are described in the form of "at least one of A and B," it will be understood that embodiments including element A exclusively, including element B exclusively, and including element A and B are each contemplated. Furthermore, although some embodiments may achieve advantages over other possible solutions or over the prior art, whether or not a particular advantage is achieved by a given embodiment is not limiting of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, embodiments described herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments described herein may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations or block diagrams of methods, apparatuses (systems), and computer program products according to embodiments of the present disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations or block diagrams.

The flowchart illustrations and block diagrams in the Figures illustrate the architecture, functionality, and operation of possible implementations of systems, methods, and computer program products according to various embodiments of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams or flowchart illustrations, and combinations of blocks in the block diagrams or flowchart illustrations, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method, comprising:
    initiating an augmented reality (AR) session within an environment comprising one or more real-world objects, wherein an environmental map of the environment is unavailable for generating AR effects for the AR session at a time of the initiation of the AR session;

after initiating the AR session, capturing a plurality of images of the environment upon detecting at least a first trigger in the environment; and upon detecting a second trigger to generate an AR effect targeting a first real-world object of the one or more real-world objects:
  generating a first virtual representation of the first real-world object, based on the plurality of images;
  upon determining that image data of a second real-world object of the one or more real-world objects partially occluded by the first real-world object is unavailable within the plurality of images:
    identifying at least one third real-world object of the one or more real-world objects behind the first real-world object, based on the plurality of images;
    determining one or more first attributes of the at least one third real-world object; and
    predicting one or more second attributes of the second real-world object based on the one or more first attributes; and
    generating a second virtual representation of the second real-world object, based on the plurality of images and the one or more second attributes.

2. The computer-implemented method of claim 1, further comprising:
  manipulating the first virtual representation, based on input from a user; and
  masking the first real-world object with the second virtual representation, while the first virtual representation is manipulated.

3. The computer-implemented method of claim 1, wherein:
  the AR session is initiated by an AR device; and
  the first trigger comprises movement of a user of the AR device.

4. The computer-implemented method of claim 3, wherein each image of the plurality of images is an image of the environment from a different viewpoint of the AR device.

5. The computer-implemented method of claim 3, wherein the AR session is initiated upon powering on the AR device.

6. The computer-implemented method of claim 3, wherein the plurality of images are captured using one or more visual sensors of the AR device.

7. The computer-implemented method of claim 3, wherein the AR device comprises an all in one head mounted AR device.

8. A non-transitory computer-readable storage medium comprising computer-readable program code embodied therewith, the computer-readable program code is configured to perform, when executed by a processor, an operation, the operation comprising:
  initiating an augmented reality (AR) session within an environment comprising one or more real-world objects, wherein an environmental map of the environment is unavailable for generating AR effects for the AR session at a time of the initiation of the AR session;
  after initiating the AR session, capturing a plurality of images of the environment upon detecting at least a first trigger in the environment; and
  upon detecting a second trigger to generate an AR effect targeting a first real-world object of the one or more real-world objects:
    generating a first virtual representation of the first real-world object, based on the plurality of images;
    upon determining that image data of a second real-world object of the one or more real-world objects partially occluded by the first real-world object is unavailable within the plurality of images:
      identifying at least one third real-world object of the one or more real-world objects behind the first real-world object, based on the plurality of images;
      determining one or more first attributes of the at least one third real-world object; and
      predicting one or more second attributes of the second real-world object based on the one or more first attributes; and
      generating a second virtual representation of the second real-world object, based on the plurality of images and the one or more second attributes.

9. The non-transitory computer-readable storage medium of claim 8, the operation further comprising:
  manipulating the first virtual representation, based on input from a user; and
  masking the first real-world object with the second virtual representation, while the first virtual representation is manipulated.

10. The non-transitory computer-readable storage medium of claim 8, wherein:
  the AR session is initiated by an AR device; and
  the first trigger comprises movement of a user of the AR device.

11. The non-transitory computer-readable storage medium of claim 10, wherein each image of the plurality of images is an image of the environment from a different viewpoint of the AR device.

12. The non-transitory computer-readable storage medium of claim 10, wherein the AR session is initiated upon powering on the AR device.

13. A system, comprising:
  at least one visual sensor;
  a processor; and
  a memory comprising instructions which, when executed on the processor, performs an operation, the operation comprising:
    initiating an augmented reality (AR) session within an environment comprising one or more real-world objects, wherein an environmental map of the environment is unavailable for generating AR effects for the AR session at a time of the initiation of the AR session;
    after initiating the AR session, capturing, via the at least one visual sensor, a plurality of images of the environment upon detecting at least a first trigger in the environment; and
    upon detecting a second trigger to generate an AR effect targeting a first real-world object of the one or more real-world objects:
      generating a first virtual representation of the first real-world object, based on the plurality of images;
      upon determining that image data of a second real-world object of the one or more real-world objects partially occluded by the first real-world object is unavailable within the plurality of images:
        identifying at least one third real-world object of the one or more real-world objects behind the first real-world object, based on the plurality of images;
        determining one or more first attributes of the at least one third real-world object; and predicting one or more second attributes of the second real-world object based on the one or more first attributes; and generating a second virtual representation of the second real-world object, based on the plurality of images and the one or more second attributes.

14. The system of claim 13, the operation further comprising:

manipulating the first virtual representation, based on input from a user; and masking the first real-world object with the second virtual representation, while the first virtual representation is manipulated.

15. The system of claim 13, wherein the first trigger comprises movement of a user of the system.

16. The system of claim 15, wherein each image of the plurality of images is an image of the environment from a different viewpoint of the system.

17. The system of claim 15, wherein the AR session is initiated upon powering on the system.

18. The system of claim 15, wherein the system comprises an all in one head mounted AR device.

* * * * *